United States Patent [19]
Ortiz Godinez

[11] Patent Number: 5,979,867
[45] Date of Patent: Nov. 9, 1999

[54] QUICK CONNECT COUPLING FOR PORTABLE LP GAS CYLINDERS

[75] Inventor: Jose J. Ortiz Godinez, Zapopan, Mexico

[73] Assignee: Forgamex, S.A. de C.V., Jalisco, Mexico

[21] Appl. No.: 08/749,065

[22] Filed: Nov. 14, 1996

Related U.S. Application Data

[63] Continuation of application No. 08/437,883, May 9, 1995, abandoned.

[30]   Foreign Application Priority Data

Feb. 9, 1995 [MX] Mexico ..................................... 950865

[51] Int. Cl.$^6$ ...................................................... F16L 29/02
[52] U.S. Cl. ............................... 251/149.4; 137/75; 285/2
[58] Field of Search ............................... 285/2, 38, 289.4; 137/68.14, 75; 251/149.4

[56]   References Cited

U.S. PATENT DOCUMENTS

| | | | |
|---|---|---|---|
| 2,842,381 | 7/1958 | Franck | 251/149.4 |
| 4,874,012 | 10/1989 | Velie | 137/557 |
| 4,911,194 | 3/1990 | Lechner | 137/75 |
| 5,027,845 | 7/1991 | Silagy | 137/75 X |
| 5,330,155 | 7/1994 | Lechner | 251/149.6 |

OTHER PUBLICATIONS

Marshall–Sherwood, Marshall–Sherwood Quick Closing Coupling QCC1, pp. 1–2.

*Primary Examiner*—John Fox
*Attorney, Agent, or Firm*—Arnold White & Durkee

[57]   ABSTRACT

Technically a functional combination of a nipple with a plug, a stem, a spring, a guide bushing and a coupling nut to form a quick disconnect device for a valve on portable cylinders for LP gas.

The device disconnects the gas supply in case of an excess flow.

10 Claims, 1 Drawing Sheet

QUICK CONNECT COUPLING FOR PORTABLE LP GAS CYLINDERS

This application is a continuation of application Ser. No. 08/437,883, filed May 9, 1995 now abandoned.

FIELD OF THE INVENTION

The present invention relates generally to connectors for fluid-carrying conduits such as LP gas cylinders. Specifically, the invention relates to thermally sensitive connectors for automatic disconnection in the event that the temperature reaches a minimum temperature.

BACKGROUND AND SUMMARY OF THE INVENTION

Quick connect couplings have been designed with thermally sensitive pieces to separate automatically if the temperature reaches a predetermined minimum temperature. Disconnection of the fluid-carrying conduits triggers an interruption in the fluid flow path. The interruption of the fluid flow path halts the flow of fuel, such as LP gas, to the heat source.

Traditional LP gas valve connectors have used a P.O.L. nipple surrounded by a left hand nut. Generally, the nut threads into the outlet section of the cylinder valve with a 0.880" thread at 14 threads/inch.

LP gas valve connectors have included a heat sensitive nut to couple the nipple to the gas cylinder. In common usage, the heat sensitive nut is exposed to direct sunlight. This exposure to sunlight has caused the nut to soften unevenly causing the conduits to prematurely disconnect. Such softening of the nut has distorted the assembly and caused premature interruptions of the fluid flow path and even, in some cases, caused malfunction of the assembly.

Thus, a need existed to prevent direct exposure to sunlight of the heat sensitive material in the coupling. The present invention provides a thermally sensitive guide bushing positioned out of direct sunlight. The guide bushing is positioned between the nipple and a right hand coupling nut. The right hand nut couples the fluid carrying conduit to a cylinder valve. When the nut and cylinder valve are coupled the guide bushing extends into the chamber created by the coupled pieces. Thus, when the device is coupled, the heat sensitive material of the guide bushing is not exposed to direct sunlight. By preventing exposure to sunlight, the guide bushing softens to failure more uniformly allowing reliable disconnection.

One object of the present invention is to provide a better connector to overcome the disadvantages of the previous technology for a quick disconnect device for portable LP gas cylinders. The present invention provides a coupling that permits the quick connection to and disconnection from valves for barbecues with LP gas.

BRIEF DESCRIPTION OF THE DRAWINGS

The foregoing and other advantages of the invention will become apparent upon reading the following detailed description and upon reference to the drawings.

DESCRIPTION OF THE PREFERRED EMBODIMENTS

Figure 1:
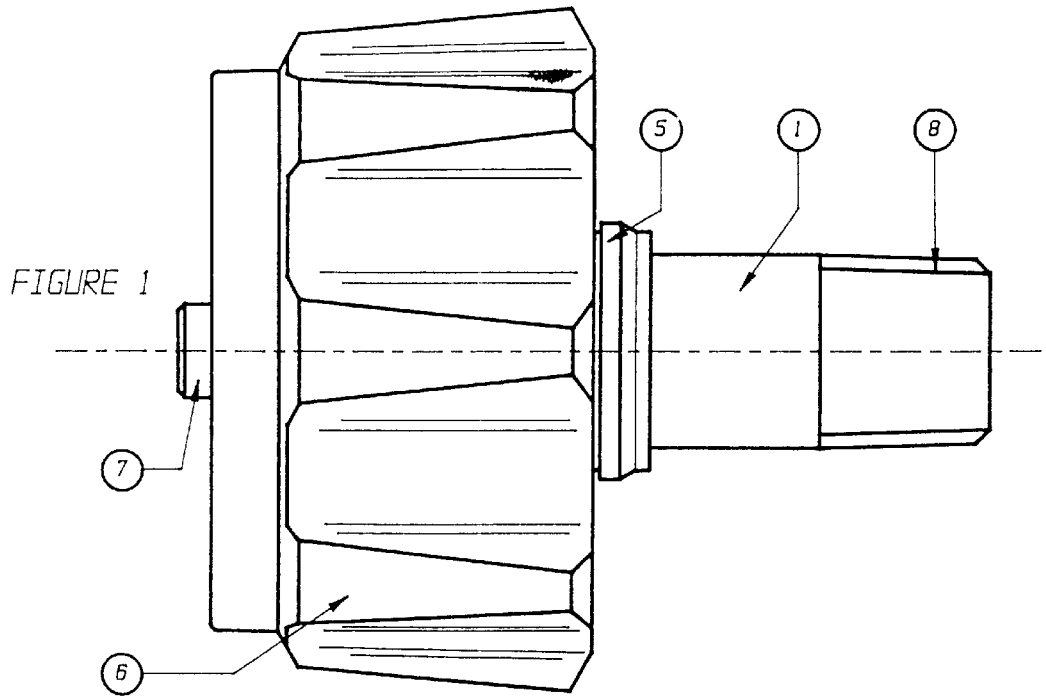
FIG. 1 is a side view of a quick connector for a portable LP gas cylinder.

Referring to FIG. 1, a fluid conduit nipple 1 is shown. The nipple 1 has a front section extending to a nose 7 and rear section having an controlled flow device (not shown) and threads 8. The nipple 1 and a right hand nut 6 form an assembly and are coupled and aligned by guide bushing 5. Guide bushing 5 rotationally connects nipple 1 and nut 6 to form an assembly allowing rotation of each of the elements, nut 6, guide bushing 5 and nipple 1, independently.

The nut 6 threads onto the outlet section of a cylinder valve (not shown) connecting the nipple 1 to the cylinder valve. The connection of nipple 1 to the cylinder valve joins the fluid carrying conduits. That connection forces nose 7 of nipple 1 to engage and open a check valve (not shown). Disconnection of the nipple 1 from the cylinder valve automatically closes the check valve, thus shutting the flow of fluid from the cylinder. Threads 8 on the second end of nipple 1 provide a means of extending the conduit.

The guide bushing 5 also serves as a thermoplastic fuse. Guide bushing 5 is designed of thermoplastic material which softens at specific temperatures. Thus, the guide bushing 5 will soften in case of fire or excessive heat. In the event of a fire or excessive heat, the guide bushing will soften and deform. Softening and deformation of the front section of guide bushing 5 will cause the disconnection of nipple 1 from the cylinder valve. Disconnection of the nipple 1 automatically closes the check valve.

When the nut 6 and outlet section of the cylinder valve are coupled, the front section of guide bushing 5 is shielded from direct sunlight by the coupled pieces. The front section of guide bushing 5 is designed to soften and distort in the event of fire or excessive heat. Thus, the portion of guide bushing 5 designed to soften and distort in the event of excessive heat is not exposed to direct sunlight.

In a preferred embodiment, a Nylon Durethan nut 6 has an internal acme thread of 1 5/16" external diameter. The 1 5/16" threads provide fast and easy coupling and disengaging of the connector. Preferably, guide bushing 5 is a Makrolon 2607 thermoplastic that softens at temperatures between 116° C. and 149° C. Preferably, the nipple is a Brass 360 type material.

Figure 2:
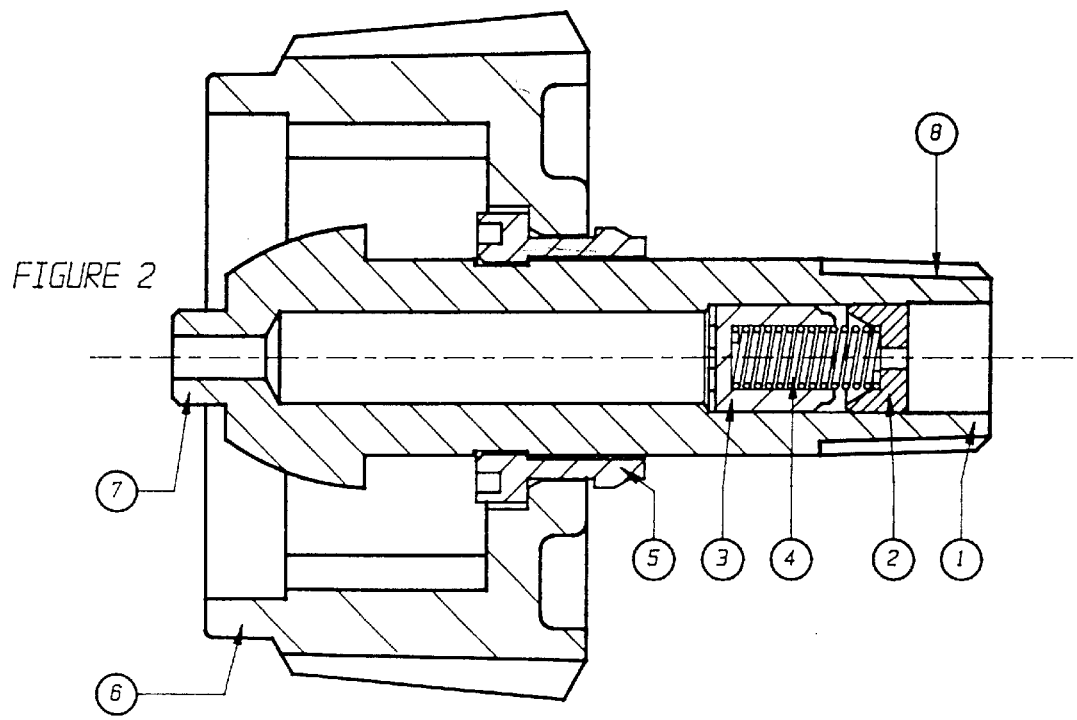
FIG. 2 is a sectional view of FIG. 1.

Referring to FIG. 2, a sectional view of the assembly of FIG. 1 is shown. The rear section of nipple 1 is force fit with plug 2. Spring 4 serves as a pressure sensitive element that separates stem 3 from plug 2 to form a controlled flow device. The controlled flow device shuts off automatically the flow of gas in case of an excess flow. Preferably, the controlled flow device includes a stainless steel spring, a Delrin 500 stem, and a Brass 360 plug.

While the invention is susceptible to various modifications and alternative forms, specific embodiments have been shown by way of example in the drawings. It should be understood that the invention is not intended to be limited to the particular forms disclosed. Rather, the invention should be interpreted to encompass all modifications, equivalents and alternatives falling within the spirit and scope of the invention and defined by the appended claims.

What is claimed is:

1. A coupling comprising:
   a. a nipple including a check valve
   b. a separate guide bushing disposed around the nipple that is composed of a material that weakens when exposed to temperatures above the high end of ambient temperatures;
   c. a separate reusable nut disposed around the nipple where the guide bushing is at least partially surrounded by the nut.

2. A coupling according to claim 1 where the nipple includes a groove adapted to receive one end of the guide bushing.

3. A coupling according to claim 1 where the guide bushing is made of a material that softens at temperatures above 115° C.

4. A coupling according to claim 1 where the guide bushing is made of thermoplastic material that softens at temperatures above 115° C.

5. A coupling according to claim 1 where the guide bushing is made of a material that softens at temperatures between 116° C. and 149° C.

6. A coupling system comprising:
   a. a fluid source including an outlet;
   b. a coupling adapted to be connected to the fluid source outlet;
   c. the coupling includes:
      (i) a nipple, including a check valve, that is adapted to be connected to the fluid source outlet;
      (ii) a separate guide bushing disposed around the nipple and composed of a material that weakens when exposed to temperatures above the high end of the ambient temperature range;
      (iii) a separate reusable nut disposed around the nipple where the guide bushing is at least partially covered by the nut; and
      (iv) the nut is adapted to connect the coupling to the fluid source outlet.

7. A coupling system according to claim 6 where the nipple includes a groove adapted to receive one end of the guide bushing.

8. A coupling system according to claim 6 where the guide bushing is made of a material that softens at temperatures above 115° C.

9. A coupling system according to claim 6 where the guide bushing is made of thermoplastic material that softens at temperatures above 115° C.

10. A coupling system according to claim 6 where the guide bushing is made of a material that softens at temperatures between 116° C. and 149° C.

* * * * *